US008174238B2

(12) United States Patent
Badger

(10) Patent No.: US 8,174,238 B2
(45) Date of Patent: May 8, 2012

(54) CHARGING CONTACT ARRAY FOR ENABLING PARALLEL CHARGING AND SERIES DISCHARGING OF BATTERIES

(76) Inventor: Berkley C. Badger, Tarpon Springs, FL (US)

( * ) Notice: Subject to any disclaimer, the term of this patent is extended or adjusted under 35 U.S.C. 154(b) by 329 days.

(21) Appl. No.: 12/657,553

(22) Filed: Jan. 22, 2010

(65) Prior Publication Data

US 2011/0181244 A1   Jul. 28, 2011

(51) Int. Cl.
*H02J 7/00* (2006.01)
*H02J 1/00* (2006.01)
*B60W 10/24* (2006.01)
*H01M 2/10* (2006.01)

(52) U.S. Cl. ....... 320/117; 320/118; 320/121; 307/10.1; 307/48; 307/66; 307/71; 180/65.29; 429/99; 429/100

(58) Field of Classification Search .................. 320/117, 320/118; 307/71; 180/65.29
See application file for complete search history.

(56) References Cited

U.S. PATENT DOCUMENTS

| 5,960,898 A * | 10/1999 | Okada et al. ................. 180/65.8 |
| 6,057,670 A * | 5/2000 | Sink et al. ..................... 320/117 |
| 7,075,194 B2 * | 7/2006 | Weidenheimer et al. ....... 307/71 |
| 2009/0079384 A1 * | 3/2009 | Harris ........................... 320/102 |

* cited by examiner

*Primary Examiner* — Patrick Assouad
*Assistant Examiner* — Nathaniel Pelton
(74) *Attorney, Agent, or Firm* — David L. Banner

(57) ABSTRACT

A contact array arrangement which both receives charging current for charging batteries of a battery pack, and which also breaks the parallel charging contact position (contact configuration in which individual batteries of the battery pack are charged in parallel) then reestablishes series connection of the batteries when a charge electrode array is urged against the contact array arrangement and when the charge electrode array is removed. A cover covering the contact array may be connected by throughbolts to a support supporting series connection contacts such that depressing the cover by imposing a downward force (e.g., the weight of a charge electrode array), moves the series connection contacts out of contact with those contacts receiving charge current. Springs return the series connection contacts to the series condition. Charge conductors fixed to the contact array pass through or by the series connection such that a very compact device results.

22 Claims, 7 Drawing Sheets

CHARGING CONTACT ARRAY FOR ENABLING PARALLEL CHARGING AND SERIES DISCHARGING OF BATTERIES

RELATED APPLICATIONS

This application relates to application Ser. No. 12/657,552 titled Battery Pack Charging System With Manually Maneuvered Charge Head filed concurrently herewith and included herein in its entirety by reference.

FIELD OF THE INVENTION

The invention pertains to battery charging apparatus and, more particularly, to an arrangement for switching battery connections so as to enable charging at a charging voltage under parallel connection conditions and reconnecting the batteries for discharging at a discharging voltage under series connection conditions.

BACKGROUND OF THE INVENTION

Electrically powered motor vehicles typically carry batteries aboard for supplying operating power. These batteries must periodically be recharged. Recharging can be accomplished in a number of ways. The vehicle may be a purely electrically operated vehicle, so that operation is fully dependent upon charge remaining in the batteries. The batteries of such vehicles must be charged from an external power source, for example, the AC mains.

Alternatively, the vehicle may be a hybrid vehicle having an onboard internal combustion engine. The internal combustion engine may provide a portion of the traction energy, either alone, or in combination with the vehicle's electric motor. In most hybrid vehicles currently available, the internal combustion engine is solely responsible for keeping the vehicles on-board batteries charged.

A new generation of hybrid vehicles, the so-called "plug-in" hybrids may also be equipped for battery recharging from an external power source such as the AC mains.

Many electrically powered vehicles, whether hybrid or purely battery powered, may have a regenerative braking feature in which braking operates a dynamic brake, which also functions as a generator for recharging the batteries.

Regardless of the type of vehicle and of the particular operating scheme, in commercially available electrically operated vehicles both of the purely electrical type and also of the hybrid type, it may become necessary or desirable that the batteries be recharged enroute. Recharging of batteries of the type suitable for powering conventional passenger vehicles presents conflicting demands. On one hand, it is desirable to minimize the time interval during which the vehicle is being charged. However, it is also desirable to limit voltages present during charging due to safety and other concerns. Most electrically powered vehicles utilize a number of individual batteries series connected to achieve a high operating voltage to power the electric motor thereof. One popular, commercially available hybrid automobile uses 210 volts as an operating voltage.

It is possible to recharge the individual batteries at limited voltage. One approach to such recharging is to charge batteries in parallel at a relatively low voltage, and to then reconnect the batteries into a series configuration for supplying power to the vehicle at a higher voltage. There is however, an inverse relationship between the available charging time and the current that must be supplied to the individual batteries. In other words, the shorter the available charging time, the higher the current required to charge the individual, parallel-connected batteries.

Inductive couplings have been developed to facilitate ready battery recharging. However, inductive couplings introduce inefficiencies, notably, heating losses from induction. It is preferable to provide direct mechanical connection between charging conductors and those conductors leading to the batteries being charged to avoid inductive losses.

Batteries can be charged over long periods of time (i.e., trickle charged), for example overnight at the residence of the operator or all day at the operator's place of business. However, even the largest capacity contemporary batteries are limited as to the practical cruising range of their associated vehicles. For relatively short "out and back" trips such as commuting to a workplace, an overnight trickle charge may be sufficient to power the vehicle. However, for longer trips, it becomes very likely that many electric vehicles will have to be recharged while the operator is between a departure point and a destination.

High current recharging requires relatively large contacts for receiving charge current, large switches for making the transition between parallel and series battery connections, and relatively large conductors for serving the contacts and switches. Such large structures are required to carry the required charging currents while minimizing resistive losses.

Passenger vehicles are consumer items. That is, they are typically operated by laymen, or people who are not trained in the mechanics and electrical systems of passenger vehicles. It is, therefore, necessary that any system for recharging the batteries of electrically powered vehicles be simple to operate and include inherent safety features so that consumers can safely recharge their vehicles.

There exists a need for a practical way to arrange relatively expeditious, relatively safe recharging at commercial premises for operators of electrical vehicles.

SUMMARY OF THE INVENTION

In accordance with the present invention there is provided a system incorporating relatively large charge receiving contact arrays for recharging electrical vehicles, while simultaneously and automatically assuring that the usual series connection of the batteries for supplying operating power is broken. This enables recharging the batteries of electrically powered vehicles at relatively low charging voltages while eliminating high voltage potentials which would typically exist when batteries are series connected for vehicle operation. The novel system also automatically reestablishes series connection after charging is complete, so as to provide seamless transition between a charging configuration and an operating configuration. Such automatic operation allows lay operators of electrically powered vehicles to be largely unaware of, and not obliged to master and perform, the battery series/parallel configuration and reconfiguration process.

The volume of the charge receiving and switching arrangement is minimized while still accommodating relatively high current charging and relatively high voltage operation of the vehicle. To achieve such small volume, the novel arrangement incorporates a feature that mechanically breaks circuit connections when a charging head is lowered into operative position for charging. The charging head has a number of circuit contacts that are mechanically moved to break the usual series connection when the charge head is lowered into place against an array of charge receiving contacts. A spring return feature reestablishes series connection of the batteries when the charge head is withdrawn. Conductors feeding individual batteries or alternatively, related battery groups are connected in their operative conditions when the parallel connection is broken, and are disconnected when the parallel connection is reestablished.

The novel arrangement also provides a particularly compact arrangement of contacts and conductors wherein the tops of the contacts are used to receive charge, while the bottoms of the same contacts are used to establish series connection. These contacts move between raised and lowered positions responsive to placement and withdrawal of the charge head onto and away from the charge receiving contacts of the charge head. Current paths are arranged to pass through the center of or past these contacts as series and parallel connections are made and broken.

The present invention enables immediate access of significant contact surface area for high current battery recharging.

The novel contact arrangement simultaneously assures isolation of electrical power from the load during recharging. It also enables charge at relatively low voltage and discharge at a relatively high voltage.

For both safety and reliability, the novel arrangement of the invention provides recessed protected charging electrodes.

The invention provides a compact package for supporting a relatively high charge rate which would be suitable for recharging stops for electric vehicles away from normal trickle charging stations at home, work, school, etc.

The novel structure also avoids power wasting inductive coupling during recharging so as to maximize charging efficiency.

It is, therefore, an object of the invention to provide a contact array for charging batteries of electrically powered vehicles and the like.

It is another object of the invention to provide a contact array system wherein contacts disposed on a vehicle, when engaged by mating contacts of a charge head, break series connections of individual batteries in a battery pack to allow parallel charging of individual batteries.

It is an additional object of the invention to provide a contact array system wherein for safety, only low voltages are present at the contact array during charging.

It is a further object of the invention to provide a contact array system wherein removal of a charging head reestablishes a series connection of individual batteries so as to provide a high operating voltage required to power the vehicle.

It is a still further object of the invention to provide a contact array system capable of carrying high charging currents to allow rapid recharging of vehicle batteries.

It is yet another object of the invention to provide a contact array system wherein contacts are at least partially covered and protected when not connected to a charging head.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 4 is a side elevational view of FIG. 2, with the contacts moved to positions appropriate for parallel charging of the associated batteries;

DETAILED DESCRIPTION OF THE PREFERRED EMBODIMENT

The present invention provides a contact and switching arrangement intended for selectively reconfiguring the batteries of an electrically powered vehicle from a series connected, operational configuration to a parallel connected, charging configuration. In a charging configuration, parallel-connected batteries are connected to a low voltage, high current power source by a plurality of charging electrodes. In the operational configuration, the batteries or cells are series connected to provide relatively high voltage power to the vehicle's drive system.

The batteries may be of any conventional type, each having a positive terminal and a negative terminal. The novel contact arrangement enables switching between an input circuit which is disposed to enable charging the plurality of the batteries at the charging voltage, and an output circuit enabling discharging of the batteries at an operating voltage. The operating voltage results from a series connection of the batteries, and will typically result in the highest voltage that can be developed from the batteries. For safety and other practical issues, the charging voltage is preferably performed at a reduced voltage relative to the operating voltage.

One significant application of the invention is expeditious charging of battery packs of electrically powered vehicles by charging facilities designed for use by the general public. In motorized vehicles, both space and weight are at a premium, and are to be minimized. Therefore, in the novel contact arrangement, the input circuit and the output circuit share as many components in common as possible, so that the terms "input circuit" and "output circuit" do not imply separate physical components.

An understanding of the present invention is most advantageously gleaned by first referring to the two types of contacts that are central to the novel contact arrangement.

Figure 1:
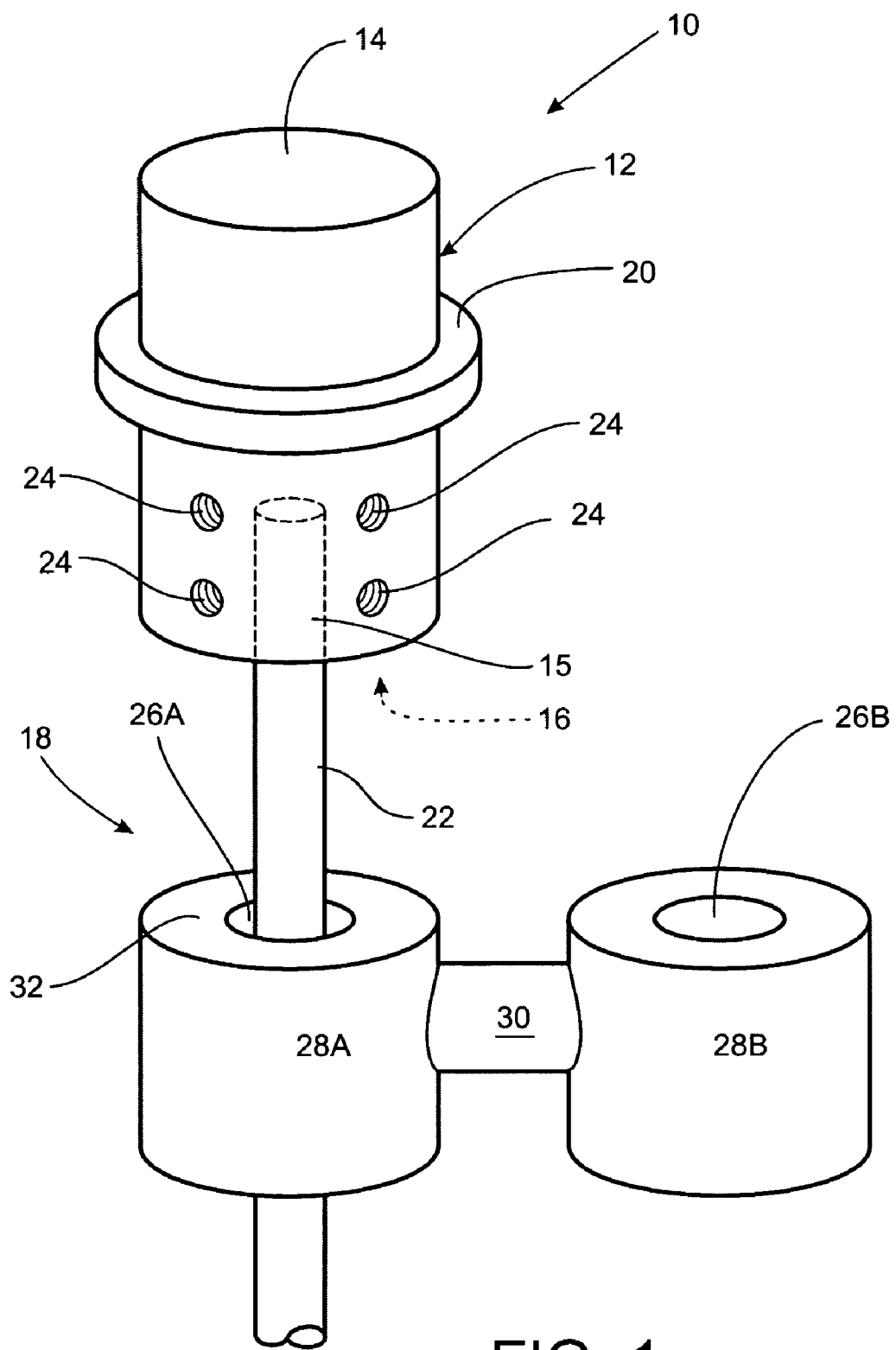
FIG. 1 is a perspective view of two types of contacts and an associated electrical conductor that play a central role in the contact arrangement in accordance with the invention.

As seen in FIG. 1, a main contact 10 typically comprises a generally cylindrical body 12 having an input contact surface 14 for making contact with a charging electrode 54, 56 (FIG. 4), an output contact surface 16 for conducting power to a series connection contact 18, and an outwardly projecting flange 20 for seating a spring 84 (shown in FIG. 8 and described hereinafter).

The input contact surface 14 is spaced apart from the output contact surface 16. The main contact 10 may have an internal bore 15 for receiving a battery connection conductor 22 therein.

The battery connection conductor 22 may be held or pinned in place by setscrews 24 to the main contact 10, thereby ensuring a good electrical connection therebetween. Battery connection conductor 22 is typically a stranded conductor surrounded by an insulating jacket (not separately identified) so that power cannot be inadvertently transferred to other parts of the circuit or to a ground (i.e., short out). As is described in more detail hereinbelow, battery connection conductor 22 has a distal end connected to a battery or cell that is to be recharged.

Battery connection conductor 22 may pass through a central opening 26A formed in the series connection contact 18, and extends to the a battery 34A . . . 34F of battery pack 62 (FIG. 5) being charged. As may be seen in FIG. 1, series connection contact 18 may comprise two generally identical hollow bodies 28A, 28B, each having respective central openings 26A, 26B. The two hollow bodies 28A, 28B are electrically connected by a conductive bridge 30. The hollow bodies 28A, 28B and the conductive bridge 30 may be monolithically formed as a single part, or alternatively may be made in separate parts which are joined together by cable, strap, or other electrically conductive element (none shown).

It should be understood then that the main contact 10 and the battery connection conductor 22 operate as a monolithic unit and can move independently relative to the series connection contact 18, which is also typically a monolithic unit. Because battery connection conductor 22 is insulated, there is no passage of electrical current to the series connection conductor 18 at the central opening 26A despite the close proximity therebetween.

Figure 2:
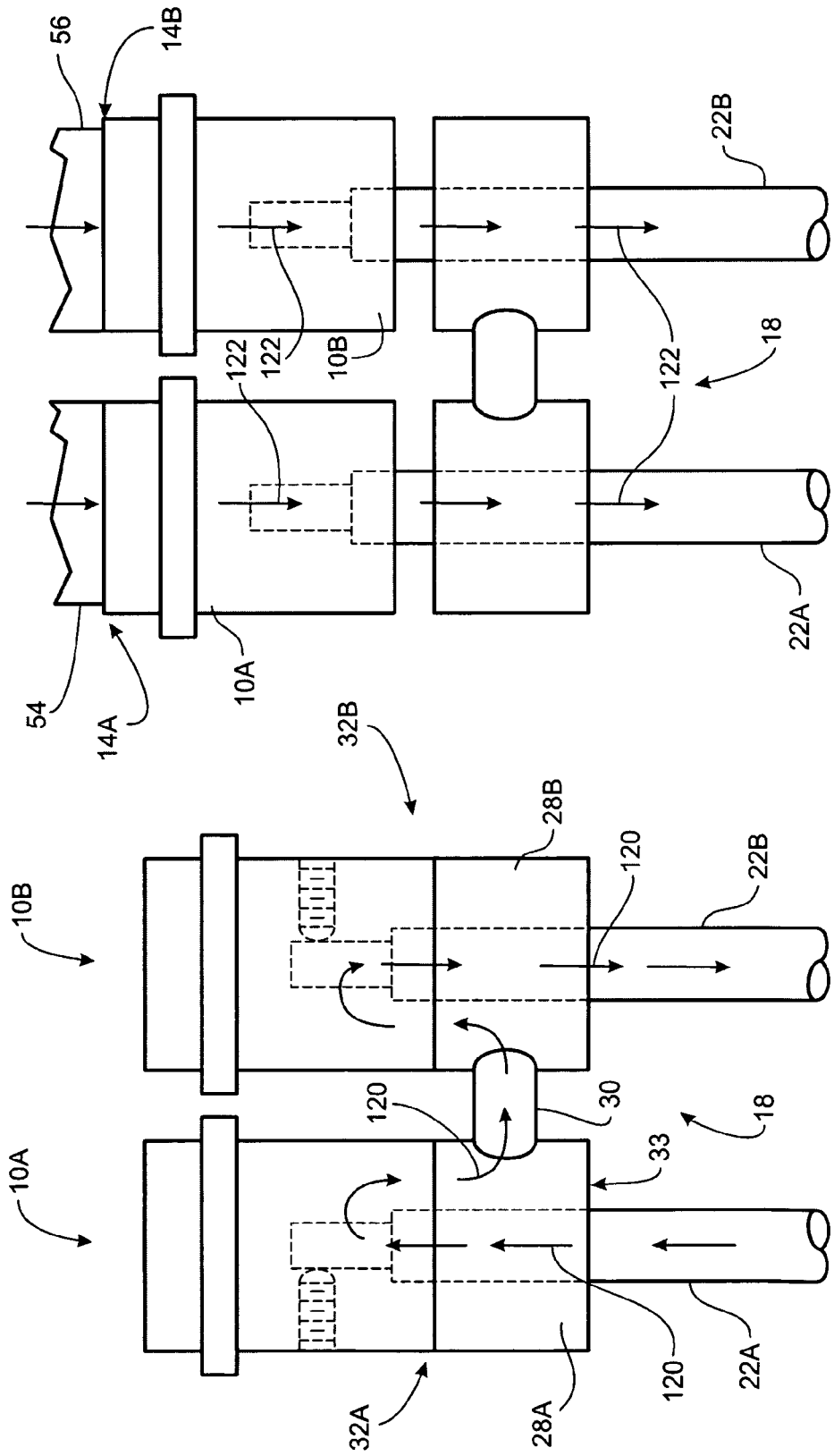
FIG. 2 is a side elevational view of functionally associated contacts and electrical conductors of the type shown in FIG. 1, with the contacts in positions appropriate for series connection of associated batteries.

FIG. 2 is a schematic representation of the connection scheme that is used to supply electrical power to a load (i.e., the operational configuration). The series connection contact 18 comprising hollow bodies 28A, 28B, cooperates with a pair of main contacts 10A, 10B. Each one of the two main contacts 10A, 10B may be identical to the main contact 10 of FIG. 1. Electrical power may be conducted from the battery pack through a battery connection conductor 22A connected to main contact 10A. Current flows into the body 12 (FIG. 1) of main contact 10A, through the output contact surface 16A thereof, and into a charge receiving surface 32A, into the hollow body 28A, through the conductive bridge 30, and into the hollow body 28B. From there, current is conducted through a charge receiving surface 32B of hollow body 28B, into main contact 10B, and then into a battery connection conductor 22B. Arrows 120 illustrate the current path.

FIGS. 1 and 2 show an advantageous feature of the contact system of the invention, notably, that each one of the battery connection conductors 22A . . . 22L (see FIG. 3) is arranged to extend past and remain electrically isolated from at least one associated series connection contact hollow body 28A, 28B or series connection contact 18 when the contact arrangement is in a charging configuration. When in an operational configuration as seen in FIG. 2, series interconnection of batteries or cells 34A . . . 34F (FIG. 3) making up a battery pack is effected through hollow bodies 28A, 28B and conducting bridge 30 interconnecting pairs of battery connection conductors (e.g., 22A/22B). The change between charging configuration (FIG. 1) and operational configuration (FIG. 2) is accomplished by relative motion of main contacts 10A . . . 10L and respective series connection contacts 18.

Furthermore, each one of the battery connection conductors 22A . . . 22L is arranged to extend downwardly, as illustrated in FIGS. 1-4 past at least one associated series connection contact 18, 38, 40, 42, 44, 46, 48 in a vertical direction parallel to the direction of relative motion between the series connection contact 18, 38, 40, 42, 44, 46, 48 and its associated main contact 10A . . . 10L. One arrangement enabling the battery connection conductors 22A . . . 22L to pass by their respective series connection contacts 18, 38, 40, 42, 44, 46, 48 is that wherein each series connection contact 18, 38, 40, 42, 44, 46, 48 has a bore such as the exemplary bores 26A, 26B seen in FIG. 1 extending therethrough, with each one of the battery connection conductors 22A . . . 22L passing through a respective bore 26A, 26B, etc. and extending through an associated series connection contact 18, 38, 40, 42, 44, 46, 48.

Figure 7:
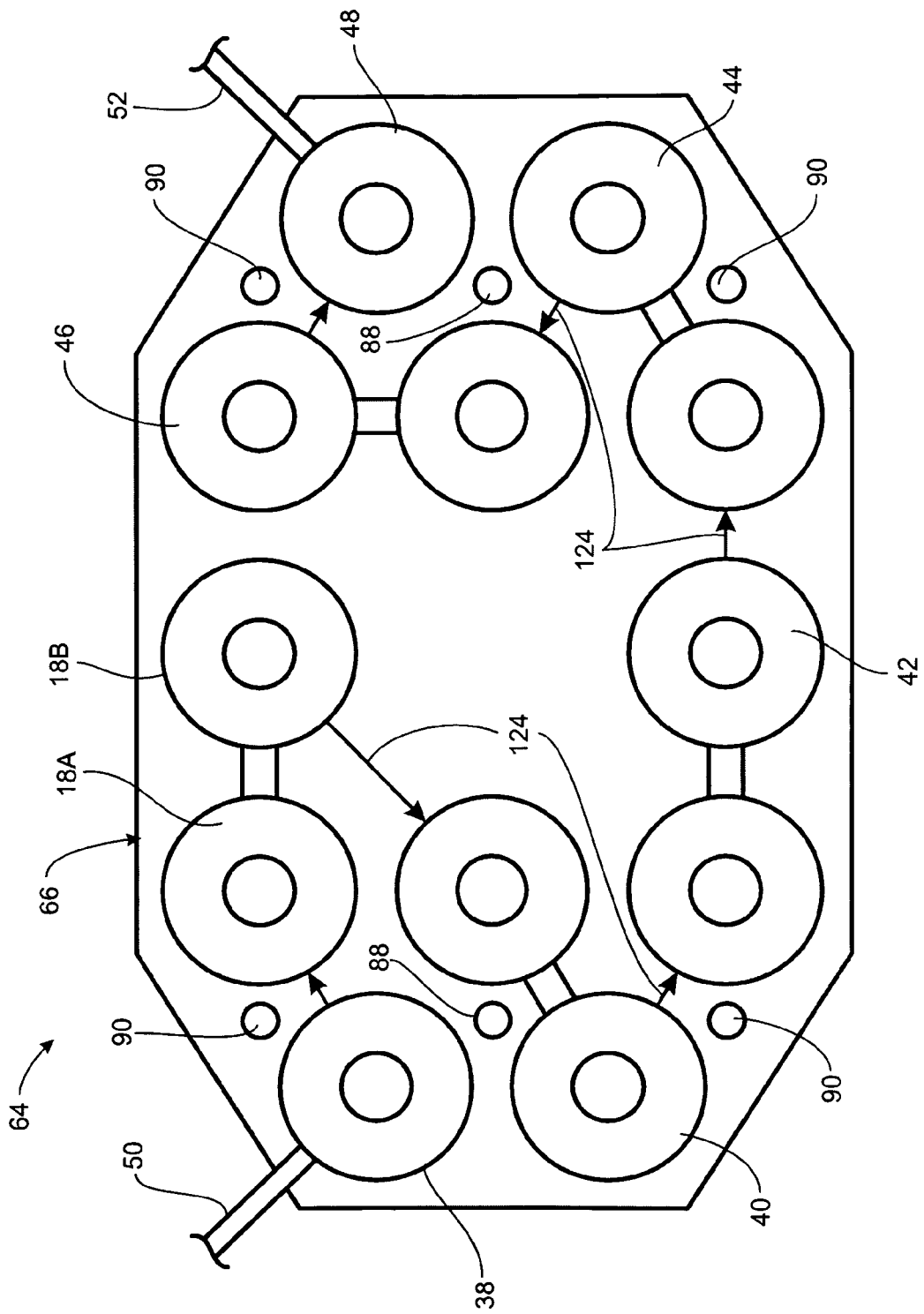
FIG. 7 is a diagrammatic top plan view of an array of series contacts such as some of the contacts shown in FIG. 3.

This arrangement allows a remarkably compact package of an array of contacts, such as the array of contacts depicted in FIG. 7. If the battery connection conductors 22A . . . 22L and their associated main contacts 10A . . . 10L and series connection contacts 18, 38, 40, 42, 44, 46, 48 were not so organized, either the function of simultaneously making charging connection while breaking series connection and vice versa would become far more complex and onerous, or alternatively, the contact array would become much greater in volume.

If desired, the bores such as the bores 26A, 26B could be non-centrally located within their respective series connection contacts 18, 38, 40, 42, 44, 46, 48.

Also, it will be recognized that configurations other than O-shaped (i.e., substantially circular) of series connection contacts 18, 38, 40, 42, 44, 46, 48 are possible. It will also be recognized that battery connection conductors 22A . . . 22L may be routed past a portion of series connection contacts to pass by their associated series connection contacts 18, 38, 40, 42, 44, 46, 48 without necessarily passing through a bore therein. For example, the series connection contacts 18, 38, 40, 42, 44, 46, 48 could be L-shaped, with the battery connection conductors passing beside the L-shape. Alternatively, the series connection contacts 18, 38, 40, 42, 44, 46, 48 could have a passageway for accommodating battery connection conductors 22A . . . 22L, which passageway could be open to the periphery of each series connection contact, such as would be seen if the series connection contacts were C-shaped or U-shaped for example. The invention is not considered limited to a particular configuration of series connection contacts 18, 38, 40, 42, 44, 46, 48, whether with a bore or without a bore. Rather, the invention is seen to include any and all suitable configurations of series connection contacts.

Figure 3:
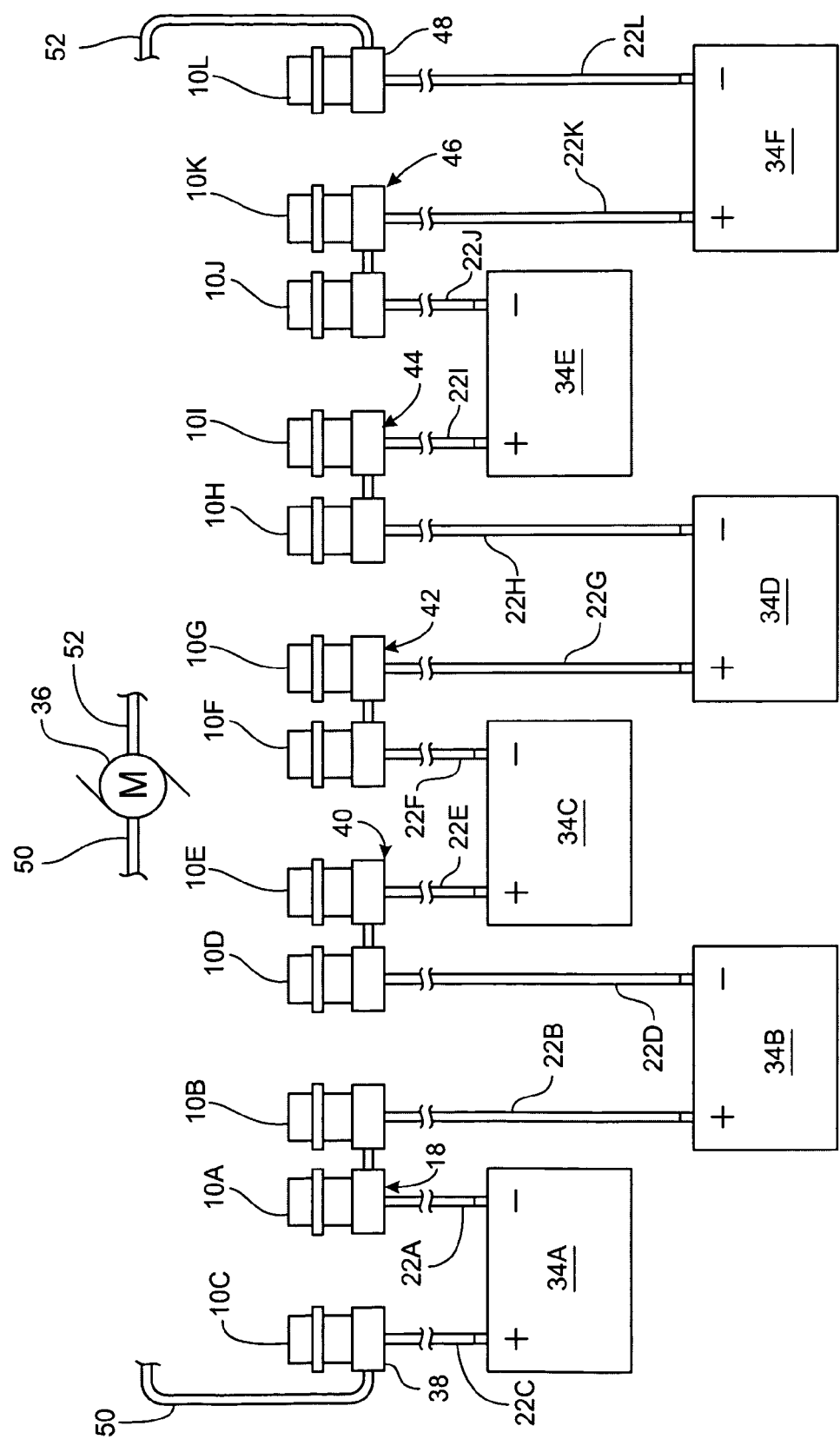
FIG. 3 is an exemplary diagrammatic view of associated batteries and a series connection thereof that may be achieved using a plurality of contacts of the type illustrated in FIG. 2.

In the connection scheme used to supply electrical power to a load chosen for purposes of disclosure, the batteries 34A . . . 34F must be series connected to develop the required operating voltage. An exemplary series connection is illustrated in FIG. 3. In the example of FIG. 3, six batteries 34A, 34B, 34C, 34D, 34E, and 34F each having a positive terminal (identified only by a positive symbol) and a negative terminal (identified only by a negative symbol) are to be series connected to power a load such as a motor 36. Series connection among the batteries 34A-34F may be accomplished using main contacts 10A, 10B, 10C, 10D, 10E, 10F, 10G, 10H, 10I, 10J, 10K, and 10L, and series connection contacts 18, 38, 40, 42, 44, 46, 48. Series connection contacts 18, 40, 42, 44, and 46 may be of the type having two hollow bodies, such as the hollow bodies 28A, 28B of FIG. 2. The series connection contacts 38 and 48 may comprise only one hollow body (not separately called out, but which may be structural and functional equivalents of the hollow body 28A for example).

Each one of the series connection contacts 18, 40, 42, 44, and 46 cooperates with two of the main contacts 10A, 10B, 10D, 10E, 10F, 10G, 10H, 10I, 10J, and 10K, as shown. It will be seen that the negative terminal of each of the batteries 34A, 34B, 34C, 34D, and 34E is connected in series to the positive terminal of an adjacent battery 34B, 34C, 34D, 34E, or 34F. The positive terminal of the battery 34A and the negative terminal of the battery 34F, being the outermost of the terminals in the series connection shown in FIG. 3, are connected directly or indirectly through suitable controls (not shown) to the motor 36 by respective conductors 50, 52. Each of these connections uses a main contact 10A, 10B, 100, 10D, 10E, 10F, 10G, 10H, 10I, 10J, 10K, or 10L to transfer current through an associated battery connection conductor 22A, 22B, 22C, 22D, 22E, 22F, 22G, 22H, 22I, 22J, 22K, or 22L (respectively), in the manner described with respect to FIG. 2. Of course, current transfer for the series connection contacts 38 and 48 does not involve a bridge conductor such as the bridge conductor 30 of FIG. 2. Rather, current is connected to the conductors 50, 52.

The series connection shown in FIG. 3 may be said to include associated pairs of main contacts (e.g., main contacts 10A and 10B, main contacts 10D and 10E, main contacts 10F and 10G, main contacts 10H and 10I, and main contacts 10J and 10K), wherein each associated pair of main contacts is disposed to connect in series respectively one positive terminal and one negative terminal of two adjacent batteries, such as any of the adjacent pairs of batteries 34A and 34B, 34B and 34C, 34C and 34D, 34D and 34E, or 34E and 34F.

The series connection of the operating configuration has now been described in detail. The parallel, charging configuration is now discussed.

Referring now also to FIG. 4, there is shown a schematic diagram of a portion of the parallel, charging configuration of the invention. The main contacts 10A, 10B and the series connection contact 18 are shown separated from one another. Unlike the configuration of FIG. 2, in this configuration there is no interconnection of battery connection conductors 22A and 22B. Voltage may be applied to the main contacts 10A, 10B by suitable charging electrodes 54, 56, respectively, shown in contact with the charge receiving input contact surfaces 14A, 14B of the main contacts 10A, 10B. Current may then flow through the main contacts 10A, 10B into respective battery connection conductors 22A, 22B to the batteries 34A, 34B, as indicated by arrows 122. Batteries 34A . . . 34F may remain connected to their various respective battery connection conductors 22A . . . 22L (FIG. 3). Recharging occurs when charging electrodes such as the charging electrodes 54, 56 are connected to an appropriate voltage at a proper polarity.

To effect the foregoing, it will be seen that each one of the series connection contacts such as the series connection contact 18 has a charge receiving surface 32A, 32B which contacts the output contact surface 16 of one of the main contacts such as the main contact 10 (FIG. 2) when the series connection contacts 18, 38, 40, 42, 44, 46, 48 abut the main contacts 10A . . . 10L, respectively in the operating configuration previously described. Also, it will be seen that the input surfaces 14 and output surfaces 16 of the main contacts 10A . . . 10L, are respectively serially aligned with the charge receiving surfaces 32 of the series connection contacts, such as the charge receiving surface 32 of the series connection contact 18, 38, 40, 42, 44, 46, 48.

Furthermore, each battery connection conductor 22A . . . 22L comprises an elongated member having a proximal end connected to one main contact 10A . . . 10L, respectively, and a distal end for connection to one of the terminals of one of the batteries 34A . . . 34F. Each battery connection conductor 22A . . . 22L is disposed in close proximity along a portion of its length to that series connection contact 18, 38, 40, 42, 44, 46, 48 which is associated with that main contact 10A . . . 10L to which the proximal end of the respective battery connection conductor 22A . . . 22L is connected. Electrical current flowing within the battery connection conductor 22A . . . 22L passes by a first side such as a bottom surface 33 (see FIG. 2) and then a second side such as the charge receiving surface 32A of the associated series connection contact 18, 38, 40, 42, 44, 46, 48 without making electrical contact therewith. Current then flows into an associated main contact 10A . . . 10L, and then flows through the second side of the series connection contact 18, 38, 40, 42, 44, 46, and 48 it had previously bypassed without making electrical connection.

Figure 5:
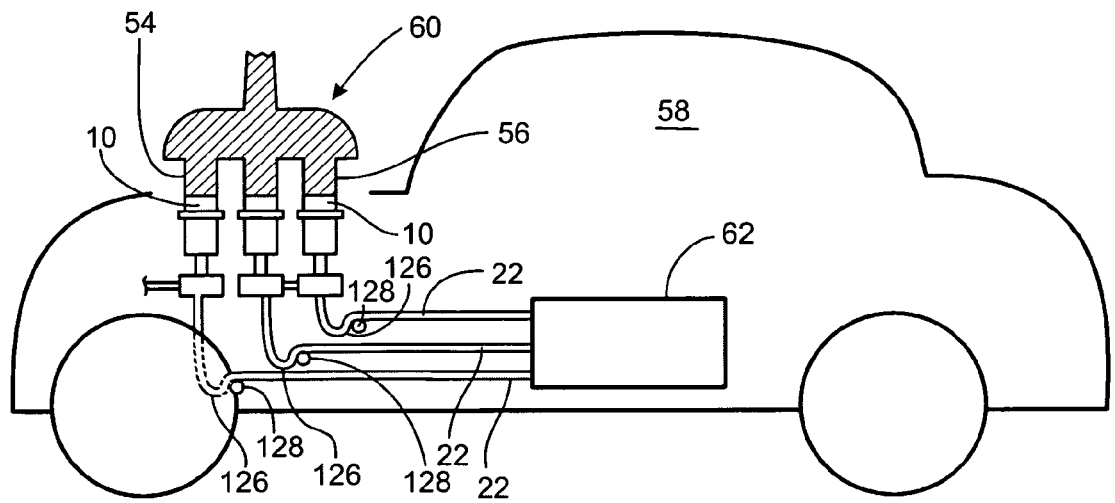
FIG. 5 is a diagrammatic side elevational environmental view of an electrically powered vehicle wherein an onboard battery pack is being recharged using a contact arrangement according to at least one aspect of the invention.

The contact arrangement thus far described is highly advantageous for electrically powered vehicles. Referring now also to FIG. 5, there is shown a side elevational, schematic view of an electrically powered vehicle 58 having an array of contacts 10A . . . 10L installed therein, contacts 10A . . . 10L being disposed in a charging configuration. A charging array 60 having charging contacts 54, 56 is disposed in electrical communication with contacts 10A . . . 10L, each having a respective charging surface 14 available to receive an externally applied recharging current. The main contacts 10A . . . 10L may each be the structural and functional equivalents of appropriate main contacts 10 (FIG. 1) and 10A, 10B (FIGS. 2 and 4) previously described. Electric current may be transferred to a battery pack 62 which may contain a group of batteries, not individually identified in FIG. 5, such as the batteries 34A-34F by battery connection conductors 22 which may be the structural and functional equivalents of the battery connection conductors 22A . . . 22L also previously described.

It will be noted that battery connection conductors 22A . . . 22L may be configured with loops 126 formed by fastening each of battery connection conductors 22A . . . 22L to an appropriate environmental member, for example a portion of the chassis, shown schematically at reference number 128, of vehicle 58. Loops 126 are disposed to provide an upwardly directed pressure on battery connection conductors to help maintain good electrical contact between battery connection conductors 22A . . . 22L and respective ones of main contacts 10A . . . 10L.

Figure 6:
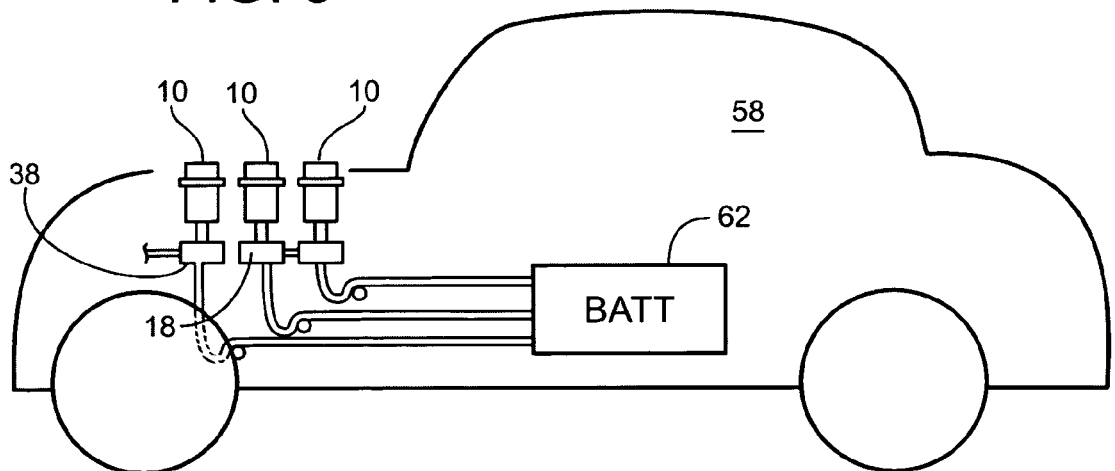
FIG. 6 is a diagrammatic side elevational view of FIG. 5, but showing recharge apparatus removed, with the electrically powered vehicle in a run mode wherein power is obtained from the onboard battery pack.

Referring now also to FIG. 6, there is a side elevational, schematic view of an electrically powered vehicle 58 having the contact arrangement installed therein and disposed in an operating, series connected configuration. In the configuration of FIG. 6, an electric motor 36 (FIG. 3) is connected to battery pack 62 so as to power vehicle 58. With the array 60 of charging electrodes removed, each one of the main contacts 10 is in contact with an associated series connection contact, any one of which may be the structural and functional equivalent of one of series connection contacts 18, 38, 40, 42, 44, 46, or 48.

When the novel contact arrangement is oriented within a vehicle such as is seen in FIGS. 5 and 6, relative motion between the main contacts such as the main contact 10 and the series connection contacts such as the series connection contact 38, is vertical motion. Also, the main contacts and the series connection contacts are in vertical alignment Referring now also to FIG. 7, there is shown a top plan view of an exemplary array 64 of series connection contacts 18, 38, 40, 42, 44, 46, and 48 that may be utilized to make connections as shown diagrammatically in FIG. 3. The series connection contacts 18, 38, 40, 42, 44, 46, and 48 may be supported on a floor plate 66 and attached thereto in any suitable way (attachment not shown). Series connection may be made among the series connection contacts 18, 38, 40, 42, 44, 46, and 48 such that voltage potentials between any two of the series connection contacts 18, 38, 40, 42, 44, 46, and 48 are minimized. Actual connection of the battery connection conductors associated with the series connection contacts 18, 38, 40, 42, 44, 46, and 48 may be ordered such that a series connection indicated by arrows 124 in FIG. 7 is achieved.

It will be recognized that each one of the series connection contacts 18, 38, 40, 42, 44, 46, and 48 mates with an associated main contact 10A . . . 10L. The first and last (i.e., exterior) contacts 38, 48 in the string of series connection contacts 18, 40, 42, 44, and 46 each have only one main contact associated therewith. Each one of the other series connection contacts 18, 40, 42, 44, and 46, each having a conductive bridge 30 associated therewith, have two main contacts associated therewith. Designation of a series connection contact as exterior signifies that it is associated with the first or the last battery terminal to be connected in the series connected circuit. Designation of a series connection contact as interior signifies that it is connected in series with terminals of other batteries, and not to conductors leading to the load.

Figure 8:
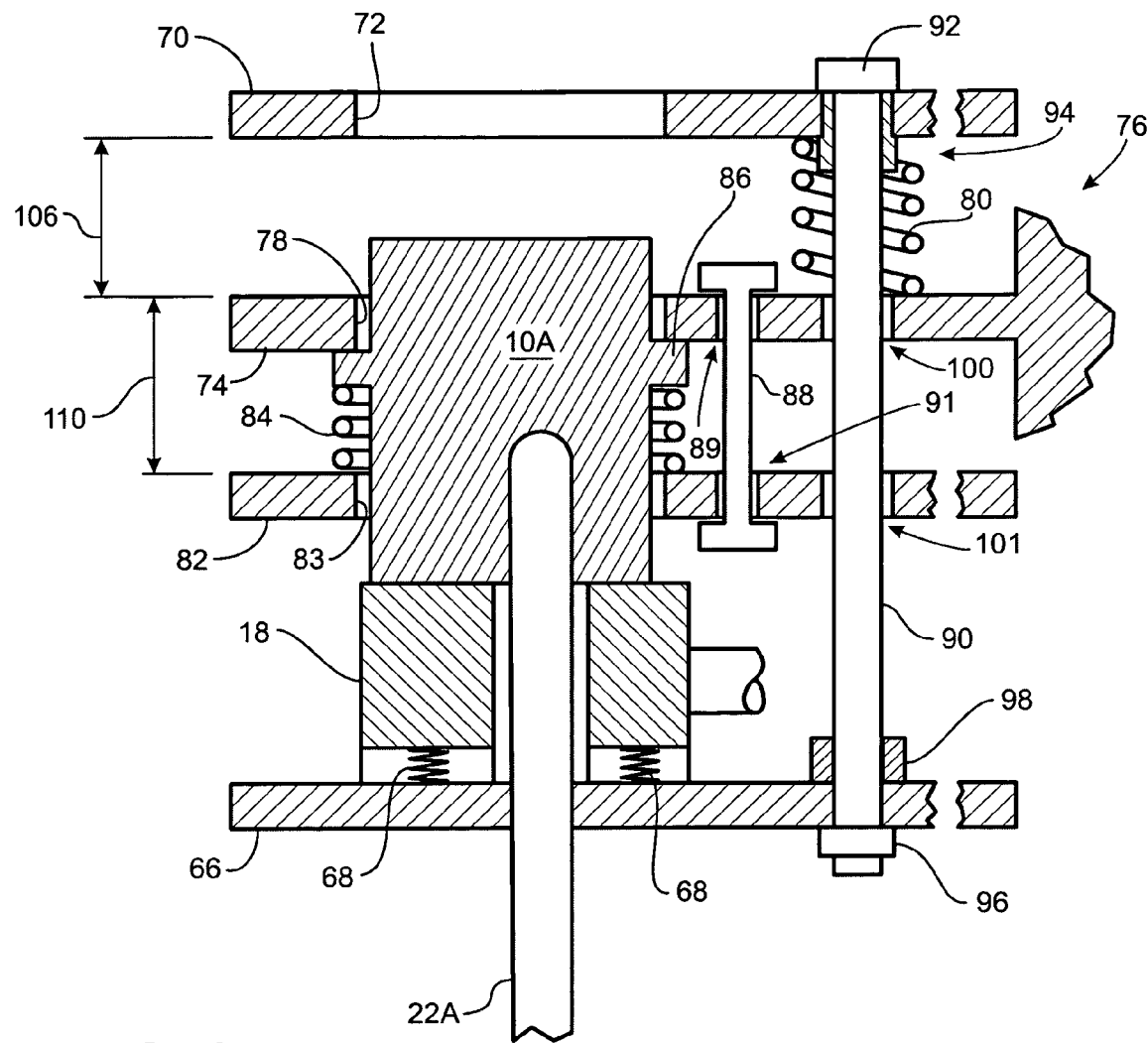
FIG. 8 is a side elevational, cross-sectional, schematic detail view of a contact arrangement disposed in a series-connected, operational configuration.

Referring now also to FIG. 8, there is shown a detailed, cross-sectional view of a portion of the contact arrangement of FIG. 2 showing how the series connection contacts 18, 38, 40, 42, 44, 46, and 48 and the main contacts 10A . . . 10L are supported in their operative positions. For clarity, only one series connection contact 18 and one main contact 10A are shown In FIG. 8. Also, minor items such as the setscrews 24 (FIG. 1) have been omitted for clarity. However, it will be understood that other series connection contacts such as the series connection contacts 38, 40, 42, 44, 46, and 48 and their associated main contacts such as the main contacts 10B-10L may be located proximate the corresponding like components which are actually illustrated, in the manner of the series connection contacts 18, 38, 40, 42, 44, 46, and 48 as seen in FIG. 7.

Series connection contact 18 rests on one or more springs 68 interposed between the series connection contact 18 and the floor plate 66. Main contact 10A seats against the series connection contact 18 and may be held thereagainst.

A cover plate 70 is disposed above the main contact 10A for generally covering the main contacts 10A . . . 10L. The cover plate 70 may have an access opening 72 to expose each main contact 10A . . . 10L, thereby providing direct access for charging by for example enabling a charging electrode such as the electrodes 54 (FIG. 5) to contact the input contact surfaces 14 (FIG. 1) of main contacts 10A . . . 10L. Typically, main contacts 10A . . . 10L remain below cover plate 70, except when exposed for charging. However, in alternate embodiments, main contacts 10A . . . 10L could remain below cover plate 70 during the charging operation. Consequently, the invention is not considered limited to any relative position between cover plate 70 and main contacts 10A . . . 10L. Also, the term "covering" is meant to describe any degree of covering ranging from completely covering to partially covering. Consequently, the invention is not limited to a particular degree of covering. Rather, the invention includes any degree of covering.

A robust support such as a chassis support plate 74 is located below cover plate 70. Chassis support plate 74 is typically fixed to the chassis or other environmental element 76 associated with the electrically powered vehicle 58 or other structure, not shown, associated with the novel contact system of the invention. Environmental element 76 forms no part of the present invention but supports the novel contact arrangement. Chassis support plate 74 has an opening 78 for selectively exposing main contacts 10A . . . 10L above chassis support plate 74. Chassis support plate 74 may be spaced apart from the cover plate 70 by a spring 80. The spring 80 may be regarded as a cover lifting element since it biases cover plate 70 upwardly away from chassis support plate 74.

A floating plate 82 is disposed between chassis support plate 74 and floor plate 66. Floating plate 82 provides a seat for a spring 84 that engages an outwardly projecting flange 86 formed in main contact 10A. Spring 84 urges main contact 10A upwardly against chassis support plate 74. Outwardly projecting flange 86 is a spring abutment member. Spring 84 thus serves as a main contact lifting element disposed to urge main contact 10A upwardly relative to chassis support plate 66, in an upward direction approaching the cover plate 70. Spring 84, surrounding main contacts 10A . . . 10L, floating plate 82 and flange 86 collectively form a main contact lifting element. Floating plate 82 has at least one passage such as opening 83 for enabling the main contacts to pass through and extend above and below floating plate 82. Each main contact 10A . . . 10L has its own dedicated opening 83 or alternatively, openings (not shown) may be provided in the floating plate 82 that span and accommodate more than one main contact 10A . . . 10L.

Floating plate 82 may be arranged to move slightly or float to accommodate minor misalignments and other disruptive influences. To support the floating plate 82 in place while enabling float, a shackle bolt 88 connects floating plate 82 to chassis support plate 74. Shackle bolt 88 is typically not solidly fixed to either floating plate 82 or chassis support plate 74. Shackle bolt 88 merely establishes limits to possible downward travel of floating plate 82 relative to chassis support plate 74. Shackle bolt 88 passes through holes 89, 91 formed in chassis support plate 74 and floating plate 82, respectively. Shackle bolt 88 provides no hindrance to movement of floating plate 82 at it moves or floats.

By contrast with the arrangement of floating plate 82, floor plate 66 and cover plate 70 are held in a fixed, spaced apart relationship by connection elements such as a throughbolt 90. Throughbolt 90 may have a fixed enlarged head 92, an upper jam nut 94 to secure the cover plate 70 to the throughbolt 90, an end nut 96, and a lower jam nut 98 to secure the floor plate 66 at the lower end of the throughbolt 90. When weight is imposed on cover plate 70, cover plate 70 may be depressed or displaced towards the chassis support plate 74 and is responsive to the imposed weight. Floor plate 66 is, likewise, downwardly displaced, thereby breaking the connections between contact surfaces 16 and 32 of each of main contacts 10A . . . 10L and series connection contacts 18, 38, 40, 42, 44, 46, and 48 as well as all other series contacts connected thereto, not specifically identified. Throughbolt 90 passes through holes 100, 101 formed in the chassis support plate 74 and floating plate 82, respectively. Holes 100, 101 accommodate downward movement or displacement of cover plate 70 in tandem with floor plate 66, without hindrance to such movement.

Floor plate 66 provides a series connection contact support adapted to engage the series connection contacts 18, 38, 40, 42, 44, 46, and 48 as well as all other series contacts connected thereto, such as 18A, 18B (FIG. 2) as well as others not specifically identified. Throughbolt 90 with its associated upper jam nut 94, end nut 96, and lower jam nut 98 are connection elements disposed to hold the series connection contact support in a fixed, spaced-apart relationship relative to cover plate 70. Springs 68 function as series connection contact 18 lifting elements disposed to urge the series connection contact 18 upwardly away from the series connection contact support (i.e., the floor plate 66), so that the series connection contacts 18 are urged against the main contact 10A when cover plate 70 is not being downwardly displaced.

It will be recognized that plates 66, 70, 74, and 82 could, under some circumstance, contact one of the contacts 10A ... 10L. For this reason, plates 66, 70, 74, and 82 should be formed from a dielectric material or, be coated with a dielectric (i.e., insulating) material to prevent electrical conduction therebetween.

Figure 9:
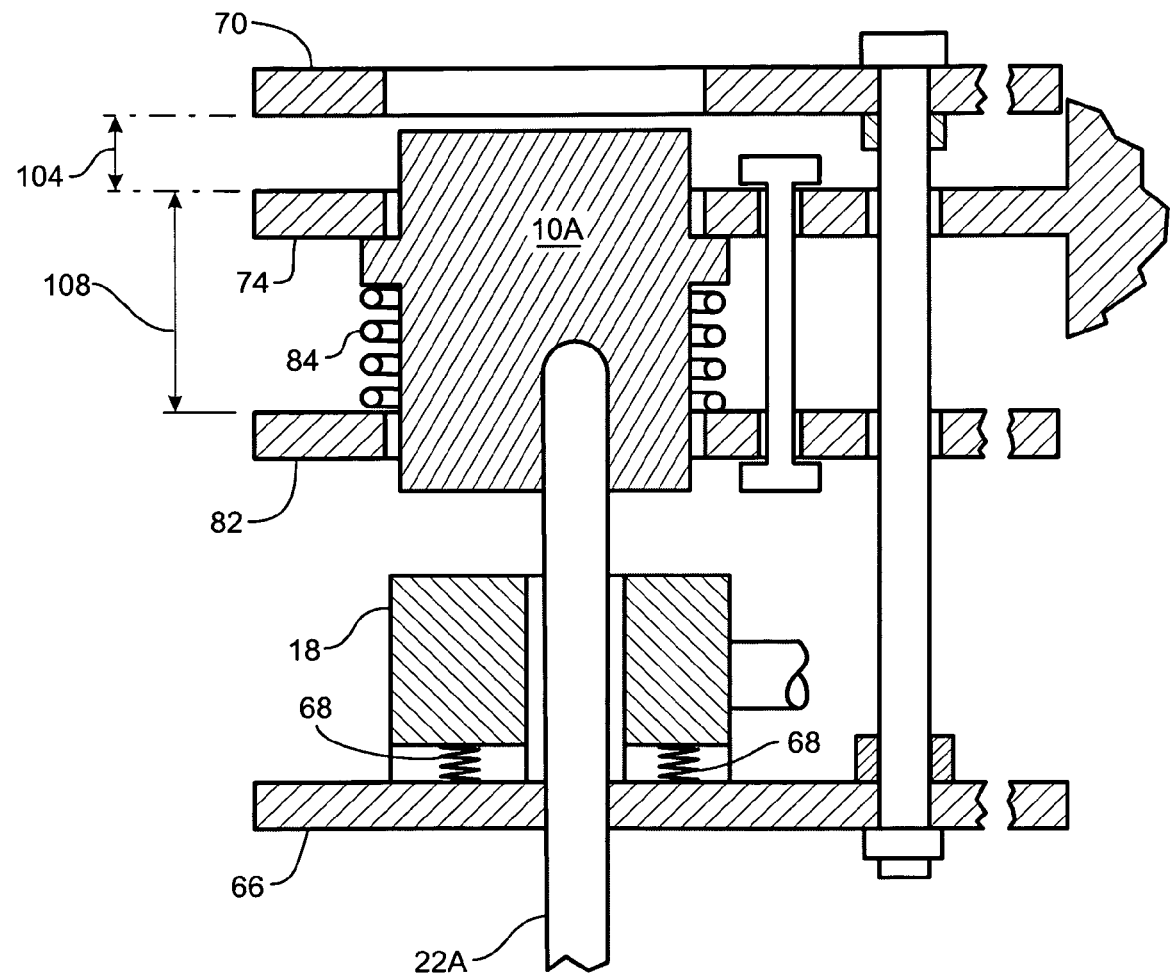
FIG. 9 is a side elevations, cross-sectional, schematic view of the contact of FIG. 8 disposed in a parallel, charging configuration.

Referring now also to FIG. 9, there is shown a detailed, cross-sectional view of a portion of the contact arrangement of FIG. 4 showing how the series connection contacts 18, 38, 40, 42, 44, 46, and 48 and the main contacts 10A ... 10L are supported in their charging positions (i.e., in the charging configuration). In FIG. 9, the positions of cover plate 70 and floor plate 66 are downwardly shifted (relative to the respective positions as shown in FIG. 8) after moving responsively to imposition of weight or downward pressure from charging array 60 as shown in FIG. 5. While it appears that the result of such movement is that main contact 10A has moved upwardly towards the cover plate 70, in fact, cover plate 70 has moved downwardly towards the main contact 10A. In other words, there is relative motion between the cover plate 70 and the main contact 10A, although the main contact 10A remains in place aside from minor adjustments enabled by movement of the floating plate 82. Main contact 10A remains in its former position abutting chassis support plate 74, held thereagainst by the spring 84.

A gap 104 between cover plate 70 and chassis support plate 74 is smaller than a corresponding gap 106 seen in FIG. 8. Also, a space 108 between an upper surface of chassis support plate 74 and the upper surface of floating plate 82 may be slightly different from a corresponding space 110 seen in FIG. 8. This difference in spaces 108, 110 is not directly related to downward displacement of the cover plate 70, but rather reflects adjustments in position of floating plate 82.

As may readily be seen, main contact 10A is now separated from series connection contact 18. This separation breaks the series connection of the batteries 34A, 34B (FIG. 3) at the same time that the movement of cover plate 70 making main contact 10A more accessible through the access opening 72. This improved accessibility provides for access to a charging electrode 54 (FIG. 5). Alternatively stated, cover plate 70 is movable relative to the main contacts 10A ... 10L, for example, main contact 10A, to selectively generate a first, relatively accessible condition of the main contacts 10A ... 10L, as seen in FIG. 9 wherein each one of the main contacts is spaced apart from the cover plate 70 at a first distance, and a second, relatively inaccessible condition of the main contacts 10A ... 10L, as seen in FIG. 8 wherein each one of the main contacts 10A ... 10L is spaced apart from the cover plate 70 at a second distance which is greater than the first distance seen in FIG. 9.

A significant aspect of the invention is that the main contact 10A is selectively operable to assume a charging connection condition for charging the batteries at a relatively low charging voltage, for example, in the configuration shown in FIGS. 4 and 9, and selectively to assume a series connection configuration of the batteries, as seen in FIGS. 2, 3, and 8, for enabling the batteries to develop the required higher operating voltage. The charging connection condition and the series connection condition result from movement of cover plate 70, floor plate 66, and series connection contact 18, the latter moving in tandem with floor plate 66 apart from minor positional adjustments accommodated by the springs 68.

FIGS. 8 and 9 representatively illustrate movement events of one individual main contact 10A and one individual series connection contact 18. Whereas FIGS. 8 and 9 are simplified for clarity of view, in fact, the entire array 64 of series connection contacts 18, 38, 40, 42, 44, 46, and 48 may all be supported and moved identically in tandem. Just as floor plate 66 is seen in FIG. 7 to extend outside the array 64 of series connection contacts 18, 38, 40, 42, 44, 46, and 48, a corresponding array of main contacts 10A ... 10L (not shown in FIG. 7), exemplified by main contact 10A shown in FIG. 1. Of course, the first and last series connection contacts 38, 48 each have only one associated main contact 10C or 10L respectively. Every other series connection contact 18, 40, 42, 44, and 46 has two of the remaining main contacts 10A, 10B, 10D, 10E, 10F, 10G, 10H, 10I, 10J, and 10K, as seen for example in FIG. 3. Series connection contacts 18, 38, 40, 42, 44, 46, and 48 and their associated main contacts 10A, 10B, 10C, 10D, 10E, 10F, 10G, 10H, 10I, 10J, 10K, and 10L all make transition between the series connection condition of FIG. 2 and the charging connection condition of FIG. 4 the same way despite the type of series connection contact (e.g. 18 or 38).

Thus, in a contact arrangement according to the present invention which includes a plurality of main contacts such as the main contacts 10A ... 10L and a plurality of series connection contacts such as the series connection contacts 18, 38, 40, 42, 44, 46, and 48, a series connection contact support such as floor plate 66 that is disposed to engage the series connection contacts 18, 38, 40, 42, 44, 46, and 48, and connection elements such as the throughbolts 90 and associated fasteners that hold the series connection contact support in fixed spacing relative to the cover plate 70, and whereby when the cover plate 70 is displaced downwardly (e.g. as illustrated in FIGS. 4 and 9), the series connection contact support is displaced downwardly and the series connection contacts 18, 38, 40, 42, 44, 46, and 48 move downwardly out of contact with main contacts 10A ... 10L. In this novel arrangement, cover plate 70 may comprise a generally horizontal plate having at least one passage such as the access opening 72 for enabling main contacts 10A ... 10L or, alternatively, charging electrodes such as charging electrodes 54 (FIG. 5), to pass through and extend above and below cover plate 70. A chassis support may comprise a generally horizontal plate such as the chassis support plate 74 having at least one passage such as the opening 78 for enabling main contacts 10A ... 10L to pass through and extend above and below chassis support plate 74. A spring seat element may comprise a generally horizontal plate such as the floating plate 82 having at least one passage such as the opening 83 for enabling the main contacts to pass through and extend above and below the spring seat element.

In summary, the novel contact arrangement may comprise a plurality of battery connection conductors such as the battery connection conductors 22A ... 22L, and an associated plurality of main contacts such as the main contacts 10A-10L, that are selectively operable to assume a charging connection configuration for charging the batteries and, alternately, to assume a series connection configuration enabling the batteries to be series connected so as to develop a desired operating voltage. More particularly, when the main contacts assume the charging connection configuration, each one of the main contacts 10A ... 10L and each associated one of the series connection contacts 18, 38, 40, 42, 44, 46, 48 break electrical contact with one another by relative motion therebetween, and each one of the main contacts 10A ... 10L assumes a first, relatively accessible disposition relative to cover plate 70 by relative motion therebetween. Consequently, each one of the series connection contacts 18, 38, 40, 42, 44, 46, 48 becomes electrically disconnected from the battery connection conductors 22A ... 22L by such relative motion. When the series connection contacts 18, 38, 40, 42, 44, 46, 48 assume the series connection configuration, each one thereof an electrical contact is established with an associated main contact 10A . . . 10L in response to the relative motion. Furthermore, relative motion between each one of the main contacts 10A . . . 10L and cover plate 70 causes the main contacts 10A . . . 10L to assume the inaccessible condition relative to the cover plate 70.

The relative motion occurs in a direction of travel best seen in FIGS. 2 and 4. The direction of travel is in a line substantially perpendicular to charge receiving surface 14 of a main contact 10A . . . 10L such as the main contact 10 of FIG. 1, and perpendicular to the charge receiving surface 32A of a series connection contact such as the series connection contact 18 of FIG. 2. In FIGS. 2 and 4, main contact 10A, its attached battery connection conductor 22A, and the bore 26A through which the battery connection conductor 22A passes remain in linear alignment throughout relative motion or travel of the series connection contact 18.

Also, the novel contact arrangement may comprise a plurality of series connection contacts such as the series connection contacts 18, 38, 40, 42, 44, 46, and 48, wherein there is one of the series connection contacts 18, 38, 40, 42, 44, 46, and 48 for each one of the main contacts 10A . . . 10L. However, note that there may be one or more than one main contact 10A . . . 10L for each series connection contact 18, 40, 42, 44, and 46, depending on whether the latter are interior contacts such as the series connection contacts 18, 40, 42, 44, and 46, or exterior contacts such as the series connection contacts 38 or 48. An association is thus established wherein one series connection contact 18, 38, 40, 42, 44, 46, and 48 has at least one associated main contact such as the main contacts 10A . . . 10L.

Although drawn as if fabricated monolithically from a single stratum of metal, the cover plate 70, the chassis support plate 74, the floating plate 82, and the floor plate 66 may be fabricated for example in sandwich style, wherein a central metallic plate is covered above and below by plates made from electrically insulating material such as ABS (acrylonitrile butadiene styrene) plastic or other synthetic resin.

It will be recognized that the novel contacts arrangement ensures complete isolation of motor 36 and any motor controller, not shown, from main contacts 10A . . . 10L during a charging operation. In addition, as the series connection of batteries 34A . . . 34F has been interrupted, no dangerous voltages resulting from the series connection thereof are present. Both a potential shock hazard to a person coming in contact with one or more of contact 10A . . . 10L or potential damage to motor 36 and or a motor controller, not shown, are possible.

The novel contact arrangement may be used with passenger automobiles, trucks, boats, forklift or other material handling trucks, military vehicles, and any other electrically powered transport vehicles. The novel contact arrangement may also be used with mobile battery packs or like power supplies that are moved to a location that is remote from a suitable charging station. For example, a battery pack intended to provide power to a facility which is to be operated for a temporary time period may enjoy the present invention. Examples of such facilities include seasonal recreational facilities, exhibition and demonstration facilities, repair, maintenance, and construction sites, mining and other sites having a relatively short-term operational life, and others.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A contact arrangement for receiving a charging voltage and switching a series of batteries from a series-connected, operating configuration to parallel, charging configuration, comprising:

a) a plurality of main contacts each having a body portion, an input contact surface disposed on a first surface thereof, an output contact surface disposed on a parallel, opposing, second surface thereof, and an electrical contact disposed within said body portion and adapted to receive an electrical conductor inserted into said body portion through an opening disposed in said opposing second output contact surface, said electrical contact being adapted to receive and retain an electrical conductor in electrical communication with said body portion;

b) a plurality of series connection contacts, each comprising: a first portion and a second portion, each of said first portion and said second portion having a charge receiving surface disposed on a first surface thereof, each of said first and said second portions being coaxially aligned along a common axis with a respective one of said plurality of main contacts, said first portion and said second portion being both electrically and physically interconnected, all of respective ones of said input contact surface, said output contacts surface and said charge receiving surface being parallel;

c) a central opening disposed in and extending completely through each of said first portion and said second portion of each of said series connection contacts, said opening being sized to allow said electrical conductors associated with a corresponding one of said main contacts to freely pass therethrough without electrical connection thereto; and d) mechanism disposed to move at least one selected from the group: said plurality of main contacts, and said plurality of series connection contacts, along said common axis to selectively create a spaced apart and a contacting relationship between each of one of said output contact surfaces of said main contacts and said charge receiving surfaces of each of said first and said second portions of said series connection contacts.

2. The contact arrangement as recited in claim 1, wherein each of said first portion and said second portion of said plurality of series connection contacts is substantially cylindrical, said charge receiving surface being formed on an end of said cylinder and said opening being disposed centrally therein and normally thereto.

3. The contact arrangement as recited in claim 2, wherein each of said first portion and said second portion of said plurality of series connection forms a torus.

4. The contact arrangement as recited in claim 1, wherein said electrical contact is electrically connected to an electrical conductor, said electrical conductor being connected to a terminal of an individual battery forming a portion of a series connected battery pack such that when said plurality of main contacts and said plurality of series connecting contacts are in said contacting configuration, at least two individual batteries of said battery pack are interconnected through respective ones of said electrical conductors, respective ones of said main contacts, and a first portion and second portion of a corresponding one of said plurality of series connector contacts, thereby establishing a portion of a series interconnection of individual batteries of said battery pack.

5. The contact arrangement as recited in claim 1, further comprising:
   e) a cover comprising at least one opening therethrough, said cover being disposed to cover said charge receiving surfaces of said plurality main contacts and to selectively expose said charge receiving surfaces of said plurality main contacts, said cover being operatively connected to said mechanism so that said cover is moved from a covered position when said plurality of main contacts and said plurality of series connection contacts are in a contacting configuration and to an exposed configuration when said plurality of main contacts and said plurality of series connection contacts are in said spaced apart configuration.

6. The contact arrangement as recited in claim 1, wherein relative motion between said plurality of main contacts and said plurality of series connection contacts is along said common axes.

7. The contact arrangement as recited in claim 1, wherein said mechanism comprises a chassis support for rigid attachment to an environmental surface and operatively connected to said plurality of main contacts and said plurality of series connection contacts.

8. The contact arrangement as recited in claim 7, wherein said environmental surface comprises a motor vehicle.

9. The contact arrangement as recited in claim 7, wherein said mechanism further comprises a main contact biasing element disposed to urge said plurality of main contacts outwardly, away from said chassis support.

10. The contact arrangement as recited in claim 9, wherein said contact biasing element comprises a spring seat element located in spaced apart relationship to said chassis support and a main contact biasing spring disposed between said spring seat element and said chassis support.

11. The contact arrangement as recited in claim 10, wherein each of said plurality main contacts comprises a spring abutment member, each of said main contact biasing springs extends between said spring seat element and one of said spring abutment members, and each main contact biasing spring is disposed to urge one of said plurality of main contacts towards said cover.

12. The contact arrangement as recited in claim 11, wherein said spring abutment member comprises a plate having at least one passage sized and configured to allow passage of one of said plurality of main contacts therethrough.

13. The contact arrangement as recited in claim 5, further comprising:
   f) a series connection contact support disposed to engage said series connection contacts; and
   g) connection elements disposed to hold said series connection contact support in fixed spacing relative to said cover, whereby when said cover is displaced downwardly, said series connection contact support is displaced downwardly and said series connection contacts are moved downwardly to establish said spaced apart relationship with said main contacts.

14. The contact arrangement as recited in claim 13, further comprising:
   h) series connection contact lifting elements disposed to urge said series connection contacts upwardly away from said series connection contact support, whereby said series connection contacts are urged against said main contacts when said cover is not being downwardly displaced, thereby establishing said contacting relationship between said series connecting contacts and said main contacts.

15. The contact arrangement as recited in claim 1, wherein each one of said electrical conductors is arranged to extend beyond and remain electrically isolated from at least one of said plurality of series connection contacts, said extension being in a direction parallel to a direction of relative motion between said plurality of series connection contacts and an associated one of said plurality of said main contacts.

16. The contact arrangement as recited in claim 15, wherein said direction of relative motion is vertical.

17. The contact arrangement as recited in claim 13, wherein said connection elements comprise throughbolts.

18. The contact arrangement as recited in claim 17, further comprising:
   h) a cover lifting element disposed to bias said cover away from said chassis support.

19. The contact arrangement as recited in claim 18, wherein said cover lifting element comprises at least one spring.

20. The contact arrangement as recited in claim 1, wherein each of said electrical contacts comprise at least one setscrew disposed to secure respective ones of said electrical conductors to a respective one of said plurality of main contacts.

21. The contact arrangement as recited in claim 13, further comprising:
   h) a series connection contact support disposed to engage said plurality of series connection contacts and said connection elements and disposed to hold said series connection contact support in fixed spacing relative to said cover, whereby when said cover is displaced downwardly, said series connection contact support is displaced downwardly and said plurality of series connection contacts move downwardly out of contact with the main contacts, wherein
   said cover comprises a generally horizontal plate having at least one passage for enabling said plurality of main contacts to pass through and extend above said cover;
   said chassis support comprises a generally horizontal plate having at least one passage for enabling said plurality of main contacts to pass through said chassis support; and
   said spring seat element comprises a generally horizontal plate having at least one passage for enabling the main contacts to pass therethrough.

22. A contact arrangement for selectively enabling charging of a plurality of batteries from a plurality of charging electrodes operating at a charging voltage, and for selectively enabling series connection of the plurality of batteries to provide power to a load, wherein each one of the batteries has a positive terminal and a negative terminal, and wherein said contact arrangement enables switching between an input circuit which is disposed to enable charging the plurality of batteries at the charging voltage, and an output circuit enabling discharging of the batteries at an operating voltage, wherein said operating voltage results from a series connection of the batteries, said contact arrangement comprising:
   a plurality of main contacts which are selectively operable to assume a charging connection condition for charging the batteries and to assume a series connection condition for enabling the batteries to develop said operating voltage, wherein each said main contact comprises an input contact surface for making contact with one of the charging electrodes, and an output contact surface spaced apart from said input contact surface, for making contact to enable series connection of the batteries, and further wherein said plurality of main contacts comprise associated pairs of main contacts disposed to connect respectively to one positive terminal and one negative terminal of the same battery;

a plurality of battery connection conductors, wherein each said battery connection conductor is disposed in electrical continuity with one said main contact;

a plurality of series connection contacts comprising one said series connection contact for each said main contact, thereby establishing an association wherein one series connection contact has one associated main contact, wherein said series connection contacts are operable to assume a series connection condition in which said contact arrangement is selectively disposed to enable a series connection among the batteries such that the operating voltage is developed; and a contact management arrangement disposed selectively to cause said main contacts to assume said charging connection condition and to cause said series connection contacts to assume said series connection condition, wherein each one of said main contacts and each said associated one of said series connection contacts move relative to each other along a direction of travel, when said main contacts assume said charging connection condition, each one of said main contacts and each associated one of said series connection contacts break electrical contact with one another by relative motion therebetween along said direction of travel, and each one of said series connection contacts becomes electrically disconnected from said battery connection conductors by said relative motion, and each said battery connection conductor comprises an elongated member having a proximal end connected to one said main contact, a distal end for connection to one of the terminals of one of the batteries, and length between said proximal end and said distal end, and said member is disposed in close proximity along a portion of its said length to that said series connection contact which is associated with that said main contact to which said proximal end is connected such that electrical current flowing within said battery connection conductor passes by one first side of said series connection contact, passes by a second side of said series connection contact, flows into said main contact, and then flows through said second side of said series connection contact.

* * * * *